(12) United States Patent
Ido et al.

(10) Patent No.: US 8,506,894 B2
(45) Date of Patent: *Aug. 13, 2013

(54) HONEYCOMB STRUCTURAL BODY AND EXHAUST GAS CONVERSION APPARATUS

(75) Inventors: Takahiko Ido, Ibi-Gun (JP); Yoshihiro Koga, Ibi-Gun (JP); Takumi Asanuma, Ibi-Gun (JP); Keisuke Tange, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 335 days.

This patent is subject to a terminal disclaimer.

(21) Appl. No.: 13/046,791

(22) Filed: Mar. 14, 2011

(65) Prior Publication Data

US 2011/0250095 A1  Oct. 13, 2011

(30) Foreign Application Priority Data

Apr. 9, 2010 (JP) ................... PCT/JP2010/056479

(51) Int. Cl.
*B01D 50/00* (2006.01)

(52) U.S. Cl.
USPC .......................................... 422/174; 422/180

(58) Field of Classification Search
USPC ........... 422/174, 177, 180; 55/523; 324/700, 324/718; 60/300
See application file for complete search history.

(56) References Cited

U.S. PATENT DOCUMENTS

| | | | | |
|---|---|---|---|---|
| 5,569,455 | A * | 10/1996 | Fukui et al. | 422/174 |
| 5,588,292 | A * | 12/1996 | Hiraishi et al. | 60/300 |
| 5,733,352 | A * | 3/1998 | Ogawa et al. | 55/523 |
| 2009/0108856 | A1* | 4/2009 | Yonushonis et al. | 324/718 |
| 2010/0308849 | A1* | 12/2010 | Bouteiller et al. | 324/700 |

FOREIGN PATENT DOCUMENTS

| | | |
|---|---|---|
| EP | 2127725 | 12/2009 |
| JP | 49-124412 U | 10/1974 |
| JP | 4-44424 U | 4/1992 |
| JP | 7-80226 | 3/1995 |
| JP | 2002-153749 | 5/2002 |
| JP | 2002-349245 | 12/2002 |
| JP | 2004-353491 | 12/2004 |

OTHER PUBLICATIONS

Extended European Search Report for corresponding EP Application No. 11153500.1-1603, Apr. 12, 2013.

* cited by examiner

*Primary Examiner* — Tom Duong
(74) *Attorney, Agent, or Firm* — Ditthavong Mori & Steiner, P.C.

(57) ABSTRACT

A honeycomb structural body includes a plurality of honeycomb units adhered to each other by interposing an adhesive layer. Each of the honeycomb units has a substantially fan shaped cross section or a substantially elliptical fan shaped cross section perpendicular to a longitudinal direction of each of the honeycomb units. First and second electrodes are provided at a part of an outer peripheral surface of each of the honeycomb units that does not face the adhesive layer and are provided at a first area between each of the honeycomb units and the adhesive layer. And/or the first and second electrodes are provided at a second area between the outer peripheral surface of each of the honeycomb units and the adhesive layer and are provided at a third area including a center of the substantially fan shaped cross section or the substantially elliptical fan shaped cross section.

50 Claims, 5 Drawing Sheets

HONEYCOMB STRUCTURAL BODY AND EXHAUST GAS CONVERSION APPARATUS

CROSS-REFERENCE TO RELATED APPLICATIONS

The present application claims priority under 35 U.S.C. §119 to International Application No. PCT/JP2010/056479, filed on Apr. 9, 2010. The contents of this application are incorporated herein by reference in their entirety.

BACKGROUND OF THE INVENTION

1. Field of the Invention

The present invention relates to a honeycomb structural body and an exhaust gas conversion apparatus.

2. Discussion of the Background

Exhaust gas of automobiles contain substances such as hydrocarbon compounds, carbon monoxide, and nitrogen oxide. A honeycomb structural body formed of cordierite is used for converting the exhaust gas. The honeycomb structural body includes plural through-holes partitioned by cell walls in which the surface of the cell walls is formed of a catalyst carrying layer formed of alumina. Catalysts such as platinum, rhodium, and palladium are carried on the catalyst carrying layer.

However, in a case where the temperature of the exhaust gas decreases, it becomes difficult for the catalyst carried on the catalyst carrying layer to sufficiently function (activate). This results in a problem of the exhaust gas converting function of the honeycomb structural body being easily degraded.

In JP-U-49-124412, there is disclosed a catalytic exhaust gas converting apparatus related to an internal combustion engine in which a heating element such as silicon carbide used as the base material of a honeycomb unit, an integral structure catalyst body formed of a single honeycomb unit is installed in a container for catalyst support connected to an exhaust gas passage by interposing an insulating member, and an outer peripheral portion of the catalyst body is connected to a terminal. Only in a condition where the catalyst body is in an atmosphere of a predetermined temperature, the catalyst body is heated by heating the base material of the honeycomb unit with a charge from a power source via the terminal on the catalyst body.

JP-P-7-80226 discloses an exhaust gas filter for converting exhaust gas of an internal combustion engine in which the exhaust gas filter is formed of an assembly of plural porous ceramic filters and a pair of self-heating electrodes provided on both ends thereof.

JP-U-49-124412 and JP-P-7-80226 are incorporated herein.

SUMMARY OF THE INVENTION

According to one aspect of the present invention, a honeycomb structural body includes a plurality of honeycomb units and first and second electrodes. The honeycomb structural body has a substantially circular-pillar shape or a substantially elliptical-pillar shape. The plurality of honeycomb units are adhered to each other by interposing an adhesive layer. Each of the plurality of honeycomb units contains a conductive ceramic material and has a substantially fan shaped cross section or a substantially elliptical fan shaped cross section perpendicular to a longitudinal direction of each of the plurality of honeycomb units. Each of the plurality of honeycomb units includes cell walls extending along the longitudinal direction to define a plurality of through-holes. The first and second electrodes are provided at a part of an outer peripheral surface of each of the plurality of honeycomb units that does not face the adhesive layer and are provided at a first area between each of the plurality of honeycomb units and the adhesive layer. And/or the first and second electrodes are provided at a second area between the outer peripheral surface of each of the plurality of honeycomb units and the adhesive layer and are provided at a third area including a center of the substantially fan shaped cross section or the substantially elliptical fan shaped cross section.

According to another aspect of the present invention, an exhaust gas conversion apparatus includes the above-mentioned honeycomb structural.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
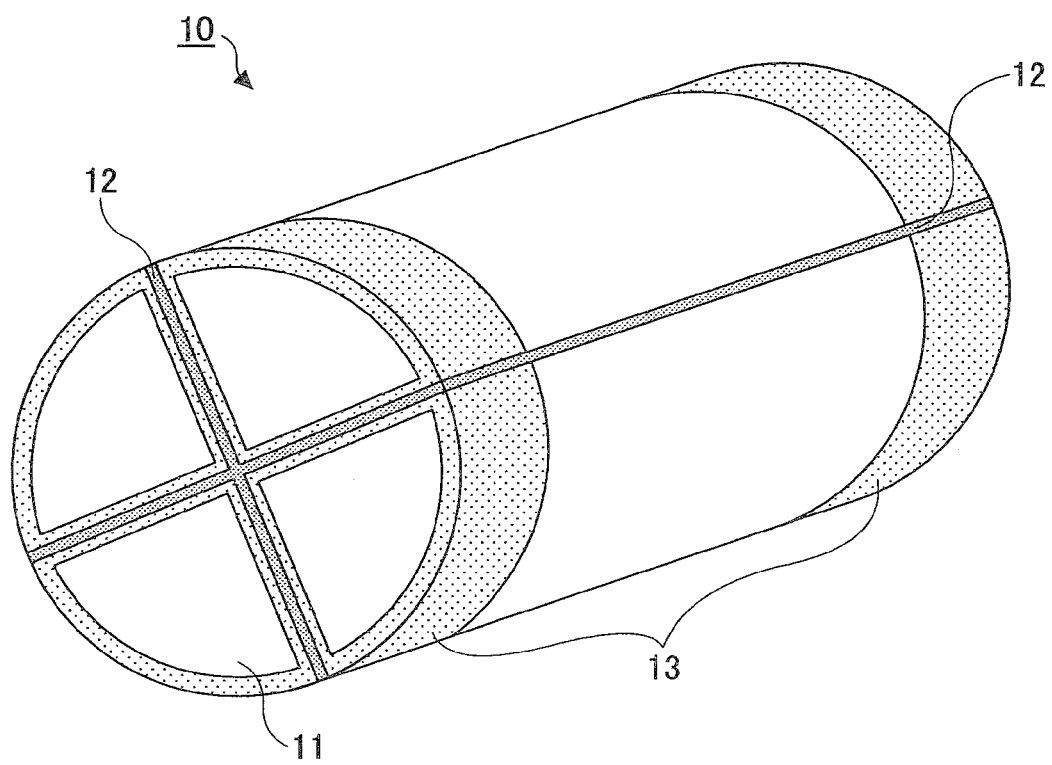
FIG. 1 is a perspective view illustrating an example of a honeycomb structural body of according to an embodiment of the present invention.

The embodiments will now be described with reference to the accompanying drawings, wherein like reference numerals designate corresponding or identical elements throughout the various drawings.

In a case of forming a pair of self-heating electrodes on both ends of the conventional integral structure catalyst body formed of a single honeycomb unit as disclosed in JP-U-49-124412, the temperature at a center portion of the catalyst body decreases. Thereby, the exhaust gas converting function is easily degraded. Further, in a case where the heat insulating function at the outer peripheral portion of the catalyst body is insufficient, the temperature at the outer peripheral portion of the catalyst body easily decreases. Thereby, cracks are easily created.

Figure 6:
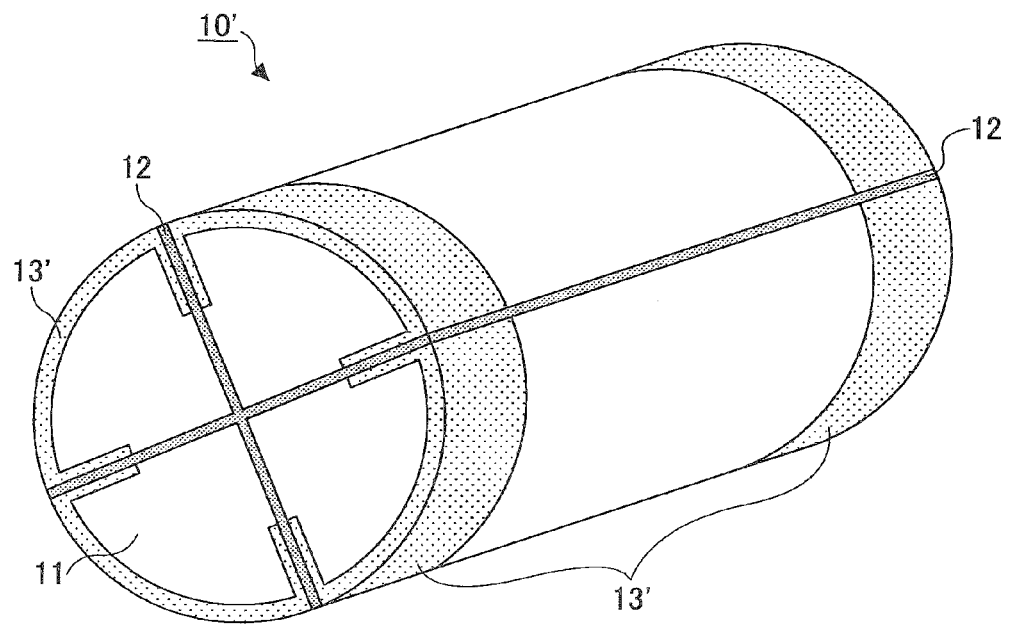
FIG. 6 is a perspective view illustrating a modified example of the honeycomb structural body of FIG. 1.

The conventional exhaust gas filter illustrated in FIG. 6 of JP-P-7-80226 includes a combination of a filter having a substantially quadrate cross section and a filter having a substantially isosceles triangle cross section and has a pair of self-heating electrodes on both ends of each of the filters. Accordingly, when canning the conventional exhaust gas filter to a metal pipe in a state where a holding sealing member is provided on the outer peripheral portion of the exhaust gas filter, the self-heating electrodes tends to disconnect due to the increasing contact pressure at the corner portions of the filter.

In light of the above, an embodiment of the present invention can obtain a honeycomb structural body capable of preventing disconnection of electrodes and locally adjusting the heating values at a center portion and an outer peripheral portion, and an exhaust gas conversion apparatus including the honeycomb structural body.

In the following, embodiments of the present invention are described with reference to the accompanying drawings.

Figure 2:
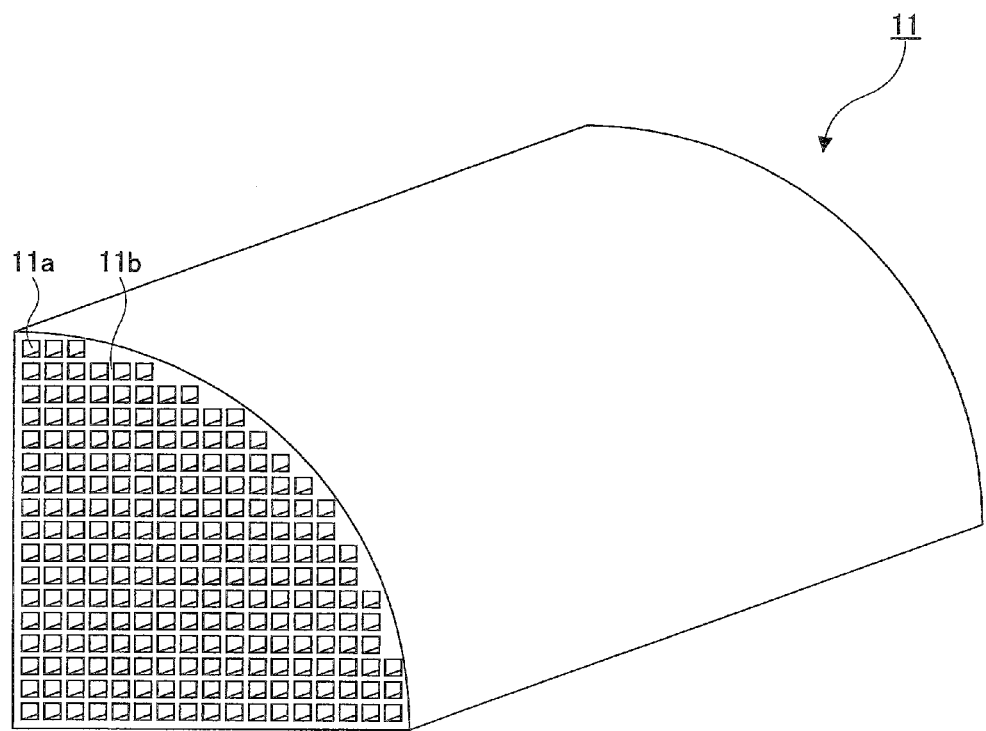
FIG. 2 is a perspective view illustrating an example of a honeycomb unit of FIG. 1.

FIG. 1 illustrates an example of a honeycomb structural body according to an embodiment of the present invention. The honeycomb structural body 10 has a substantially circular-pillar shape and includes four pillar-shaped honeycomb units 11 adhered to each other by interposing an adhesive layer 12. Each honeycomb unit 11 includes plural substantially square pillar-shaped through-holes 11a partitioned by cell walls 11b and arranged in a longitudinal direction of the honeycomb unit 11 (see FIG. 2). The cross section of the honeycomb unit, being perpendicular to the longitudinal direction of the honeycomb unit 11, has a substantially fan-like shape having a central angle of approximately 90 degrees. The honeycomb unit 11 includes a conductive ceramic material. Further, first and second belt-like electrodes 13 are formed on the entire outer periphery of both end portions of each honeycomb unit 11 relative to the longitudinal direction of the honeycomb unit 11.

It is to be noted that, in the specification and claims of the present application, the end portion of the honeycomb unit 11 includes the vicinity of the end portion of the honeycomb unit 11. Further, the vicinity of the end portion of the honeycomb unit 11 refers to a distance of approximately 30 mm or less from an end face of the honeycomb unit 11. Further, the outer peripheral surface does not include the end face.

The belt-like electrodes 13 are formed on an outer peripheral surface which does not face the adhesive layer 12 of the honeycomb unit 11. Further, the belt-like electrodes are formed in a manner extending to an area between the honeycomb unit 11 and the adhesive layer 12. Further, the belt-like electrodes are formed in an area between the outer peripheral surface of the honeycomb unit 11 and the adhesive layer 12. Further, the belt-like electrodes are formed in an area including the center of the fan-like shaped cross section perpendicular to the longitudinal direction of the honeycomb unit 11. Accordingly, in a case where, for example, voltage is applied from an automobile battery to the four pairs of the belt-like electrodes 13 via annular conductive members electrically connected to the four pairs of the belt-like electrodes 13, it becomes easy for the current density of the electric current flowing through the center portion of the honeycomb unit 11 and the current density of the electric current flowing through the outer peripheral portion of the honeycomb unit 11 to become substantially uniform. As a result, the heating value of the center portion of the honeycomb unit 11 and the heating value of the outer peripheral portion of the honeycomb unit 11 become substantially uniform. Accordingly, it becomes easy for the temperature of the center portion of the honeycomb unit 11 and the temperature of the outer peripheral portion of the honeycomb unit 11 to become uniform. Further, because a substantially equal voltage is applied to the four honeycomb units 11, it becomes easy for the temperature of the honeycomb structural body 10 to become uniform.

It is to be noted that the center portion of the honeycomb unit 11 refers to a region towards the center of the substantially fan-like shaped cross-section and an outer peripheral region refers to a region towards the outer periphery of the substantially fan-like shaped cross-section in a case where the distance from the center of the substantially fan-like shaped cross section to the outer periphery of the fan-like shaped cross section is substantially equally divided into two regions.

Figure 8:
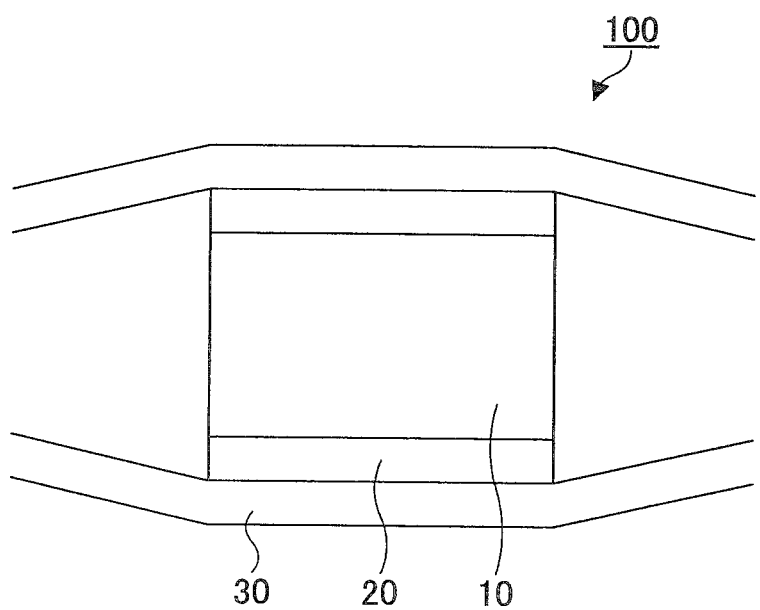
FIG. 8 is a cross-sectional view illustrating an example of an exhaust gas conversion apparatus according to an embodiment of the present invention.

Further, because the honeycomb structural body 10 has a substantially circular-pillar shape, it becomes easy for the contact pressure applied to the outer peripheral portion of each honeycomb unit 11 to become substantially equal even in a case of canning the honeycomb structural body 10 to a metal pipe 30 in a state where a holding sealing member 20 is provided to the outer peripheral portion of the honeycomb structural body 10 (see FIG. 8). Accordingly, it is difficult for disconnection of the belt-like electrodes 13 to occur.

Although the conductive ceramic material of the honeycomb unit 11 is not to be limited in particular as long as the honeycomb unit can sufficiently generate heat when predetermined current flows through the honeycomb unit 11, the conductive ceramic material may be, for example, a silicon carbide doped with aluminum nitride, aluminum, and the like.

It is preferable for the resistance between the belt-like electrodes 13 of the honeycomb unit 11 to range from approximately $1\Omega$ to $1 \times$ approximately $10^3\Omega$. In a case where the resistance between the belt-like electrodes 13 of the honeycomb unit 11 is equal to or more than approximately $1\Omega$, it becomes easy for heat to be sufficiently generated in the honeycomb unit when current is distributed through the honeycomb unit 11 according to Joule's law. On the other hand, in a case where the resistance between the belt-like electrodes 13 of the honeycomb unit 11 is equal to or less than approximately $1 \times 10^3\Omega$, it becomes difficult for the current flowing in the honeycomb unit 11 to become low when power is applied between the belt-like electrodes 13 from a high capacity battery used in, for example, a hybrid automobile. As a result, it becomes easy for heat to be sufficiently generated in the honeycomb unit 11.

In a case where there is unevenness in the resistances of the four honeycomb units 11, it is preferable to adjust the distance between the belt-like electrodes 13 so that the resistances between the belt-like electrodes 13 become substantially equal. Thereby, in a case where current is distributed in the four honeycomb units 11, it becomes easy for the heating value of the four honeycomb units 11 to become substantially equal.

It is preferable for the honeycomb unit 11 to have a porosity ranging from approximately 25% to approximately 50%. In a case where the porosity of the honeycomb unit 11 is equal to or more than approximately 25%, it becomes difficult for the thermal capacity of the honeycomb unit 11 to increase. Thereby, it becomes easy for heat to be generated in the honeycomb unit 11. On the other hand, in a case where the porosity of the honeycomb unit 11 is equal to or less than approximately 50%, it becomes difficult for the strength of the honeycomb unit 11 to become insufficient.

It is to be noted that the porosity of the honeycomb unit 11 can be measured by using a mercury penetration method.

It is preferable for the cross section perpendicular to the longitudinal direction of the honeycomb unit 11 to have an area ranging from approximately 5 $cm^2$ to approximately 50 $cm^2$. In a case where the cross section perpendicular to the longitudinal direction of the honeycomb unit 11 has an area equal to or more than approximately 5 $cm^2$, it becomes difficult for the pressure loss of the honeycomb structural body 10 to increase. On the other hand, in a case where the cross section perpendicular to the longitudinal direction of the honeycomb unit 11 has an area equal to or less than approximately 50 $cm^2$, it becomes difficult for the strength against thermal stress applied to the honeycomb unit 11 to become insufficient.

It is preferable for the cross-section perpendicular to the longitudinal direction of the honeycomb unit 11 to have an opening ratio ranging from approximately 50% to approximately 85%. In a case where the cross-section perpendicular to the longitudinal direction of the honeycomb unit 11 has an opening ration equal to or more than approximately 50%, it becomes difficult for the heat capacity of the honeycomb unit 11 to increase. Thereby, it becomes easy for heat to be generated the honeycomb unit 11. On the other hand, in a case where the cross-section perpendicular to the longitudinal direction of the honeycomb unit 11 has an opening ration equal to or less than approximately 85%, it becomes difficult for the strength of the honeycomb unit 11 to become insufficient.

It is preferable that the density of the through-holes of the cross section perpendicular to the longitudinal direction of the honeycomb unit 11 to range from approximately 15.5 to approximately 186 units per $cm^2$, more preferably approximately 31 to approximately 155 units per $cm^2$, and still more preferably approximately 46.5 to approximately 124 units per $cm^2$. In a case where the density of the through-holes of the cross section perpendicular to the longitudinal direction of the honeycomb unit 11 is equal to or more than approximately 15.5 units per $cm^2$, it becomes easy for exhaust gas and catalyst to contact where the catalyst is carried on the cell walls 11b of the honeycomb unit 11. As a result, it becomes difficult for the conversion rate of the exhaust gas to decrease. On the other hand, in a case where the density of the through-holes of the cross section perpendicular to the longitudinal direction of the honeycomb unit 11 is equal to or less than approximately 186 units per $cm^2$, it becomes difficult for the pressure loss of the honeycomb structural body 10 to increase.

It is preferable for the cell walls 11b of the honeycomb unit 11 to have a thickness ranging from approximately 0.05 mm to approximately 0.30 mm. In a case where the thickness of the cell walls 11b is equal to or more than approximately 0.05 mm, it becomes difficult for the strength of the honeycomb unit 11 to decrease. On the other hand, in a case where the thickness of the cell walls 11b is equal to or less than approximately 0.30 mm, it becomes difficult for the thermal capacity of the honeycomb unit 11 to increase. Thereby, it becomes easy for heat to be generated in the honeycomb unit 11.

A catalyst may be carried on the cell walls 11b of the honeycomb unit 11.

The catalyst carried on the cell walls 11b is not particularly limited in particular as long as exhaust gas can be converted. The catalyst may be, for example, platinum, rhodium, palladium and the like.

A catalyst carrying layer containing y-alumina is formed on the surface of the cell walls 11b of the honeycomb unit 11. It is preferable for the catalyst to be carried on the catalyst carrying layer.

The honeycomb unit 11 is formed of silicon carbide doped with aluminum nitride. Although the method for manufacturing the honeycomb unit 11 formed of silicon carbide doped with aluminum nitride is not limited in particular, the method may be, for example, baking a molded body molded by using a raw material paste containing silicon carbide and aluminum nitride.

It is preferable for the content of the aluminum nitride in the raw material paste to range from approximately 0.1 mass % to approximately 30 mass %.

According to necessity, the raw material paste may further contain an organic binder, a dispersion medium, a molding auxiliary agent, or the like.

Although the organic binder is not limited in particular, the organic binder may include methyl cellulose, carboxymethyl cellulose, hydroxyethyl cellulose, polyethylene glycol, phenol resin, epoxy resin, or the like. The organic binder may include two or more of the methyl cellulose, carboxymethyl cellulose, hydroxyethyl cellulose, polyethylene glycol, phenol resin, epoxy resin, or the like.

The content of the organic binder in the raw material paste is preferably approximately 1 mass % to approximately 10 mass % with respect to silicon carbide.

Although the dispersion medium included in the raw material paste is not limited in particular, the dispersion medium may include water, an organic solvent (such as benzene), and alcohol (such as methanol), or the like. The dispersion medium may include two or more of water, an organic solvent (such as benzene), and alcohol (such as methanol), or the like.

Although the molding auxiliary agent included in the raw material paste is not limited in particular, the molding auxiliary agent may include ethylene glycol, dextrin, fatty acid, fatty acid soap, polyalcohol, or the like.

Although the method for preparing the raw material paste is not limited in particular, the raw material paste may be mixed through a mixer and an attritor and the like, or kneaded through a kneader and the like.

Although the method for molding the raw material paste is not limited in particular, the raw material paste may be subject to extrusion molding and the like.

Although a drying apparatus for drying the molded body is not limited in particular, the drying apparatus may be a microwave drying apparatus, a hot-air drying apparatus, a dielectric drying apparatus, a pressure-reduction drying apparatus, a vacuum drying apparatus, a freeze drying apparatus, or the like. The dried molded body is preferably degreased, for example, at approximately 400° C. for approximately two hours.

The degreased molded body is preferably fired, for example, at approximately 2200° C. for approximately three hours in an inert gas (e.g., argon) atmosphere.

It is to be noted that nitrogen may be added during the firing process, so that silicon carbide can be doped with the nitrogen.

Instead of using the above-described honeycomb unit 11, an alternative honeycomb unit having conductive material provided inside the pores of the base material (aggregate) of the alternative honeycomb unit may be used.

Although the base material of the honeycomb unit is not limited in particular, the base material of the honeycomb unit 11 may be, for example, silicon carbide, aluminum titanate, cordierite, alumina, silica, zirconia, zeolite and the like.

Although the method for manufacturing the base material of the honeycomb unit 11 formed of silicon carbide is not limited in particular, the method for manufacturing the base material of the honeycomb unit 11 may be, for example, a method using a raw material that does not contain aluminum nitride, or the like.

It is preferable for the pores of the base material of the honeycomb unit 11 to include conductive material.

Although the conductive material provided inside the pores of the base material of the honeycomb unit 11 is not limited in particular as long as the conductive material can be sufficiently generated heat when applied with power, the conductive material may be, for example, silicon or silicide such as nickel silicide, chrome silicide, iron silicide, or the like.

Although the method for forming a conductive layer including silicon is not limited in particular, a method for forming the conductive layer including silicon may be, for example, a method that impregnates the surface of the base material of the honeycomb unit with a slurry containing a molten silicon, silicon, or a silicon precursor or the like.

In order to make the center portion of the honeycomb structural body easier to generate heat, the center angle of the fan-like shaped cross section perpendicular to the longitudinal direction of the honeycomb unit 11 is not limited in particular as long as the center angle of the fan-like shaped cross section is approximately 90 degrees or less. The center angle of the fan-like shaped cross section is preferably approximately 75 degrees or less, and more preferably approximately 60 degrees or less.

Instead of using the above-described through-holes 11a of the honeycomb unit 11, the substantially square-pillar shape of the through-holes 11a may be, for example, a substantially triangular-pillar shape, a substantially hexagonal-pillar shape and the like.

It is preferable for the adhesive layer 12 of the honeycomb structured body 10 to have a thickness ranging from approximately 0.5 mm to approximately 2 mm. In a case where the thickness of the adhesive layer 12 is equal to or more than approximately 0.5 mm, adhesive strength between the honeycomb units 11 is insufficient. On the other hand, in a case where the thickness of the adhesive layer 12 is equal to or less than approximately 2 mm, it becomes difficult for the pressure loss of the honeycomb structural body 10 to increase.

Although the method for adhering the honeycomb units 11 is not limited in particular, the method may be, for example, applying an adhesive-layer paste on the honeycomb unit 11 and then solidifying the applied adhesive-layer paste by drying, or the like.

Although the adhesive-layer paste is not limited in particular, the adhesive-layer paste may be, for example, a mixture of an inorganic binder and inorganic particles, a mixture of an inorganic binder and inorganic fibers, a mixture of an inorganic binder, inorganic particles and inorganic fibers, or the like.

Although the inorganic fibers contained in the adhesive-layer paste is not limited in particular, the material of the inorganic fibers may be, for example, alumina, silica, silicon carbide, silica alumina, glass, potassium titanate, aluminum borate, and the like. These materials may be used singularly or used in combination. Among these materials, silica alumina is preferable.

Although the inorganic binder contained in the adhesive-layer paste is not limited in particular, the material of the inorganic binder may be, for example, an inorganic sol (e.g., alumina sol, silica sol, titania sol), a clay binder (e.g., white earth, kaolin, montmorillonite, sepiolite, attapulgite), and the like. These materials may be used singularly or used in combination. Among these materials, alumina sol, silica sol, and titania sol is preferable.

Although the inorganic particles contained in the adhesive-layer paste are not limited in particular, the material of the inorganic particles, may be, for example, silicon carbide, alumina, silica, titania, zirconia, ceria, mullite, and the like. These materials may be used singularly or used in combination. Among these materials, silicon carbide is preferable.

Further, the adhesive-layer paste may contain an organic binder.

Although the organic binder contained in the adhesive-layer paste is not limited in particular, the material of the organic binder may be, for example, polyvinyl alcohol, methyl cellulose, ethyl cellulose, carboxylmethyl cellulose, and the like. These materials may be used singularly or used in combination.

It is to be noted that, instead of manufacturing the above-described honeycomb structural body 10 having a substantially circular-pillar shape, a honeycomb structural body 10 having a substantially elliptical-pillar shape may be manufactured. In other words, the honeycomb structural body 10 substantially has a substantially straight cylinder shape or a substantially elliptical cylinder shape, i.e. a substantially straight cylinder having a substantially elliptical shape as a base. In this case, the shape of the cross-section (perpendicular to the longitudinal direction of the honeycomb unit 11) of the honeycomb unit 11 of the honeycomb structural body 10 is a substantially elliptical-like fan shape.

In the specification and the claims of the present application, the substantially elliptical shape or the substantially elliptical shape of the substantially elliptical fan-like shape includes a substantially track-like shape having two substantially semi-circle shapes formed by connecting two substantially equal length lines. In other words, two substantially semi-cylinder shapes are connected. The substantially fan-like shape can be described by a combination of plural parts of substantially cylinder shapes being connected with each other, each part having a part of a substantially circle shape or an elliptical shape, for example, a substantially half or a substantially quarter of a substantially circle shape or a substantially elliptical shape as a base.

It is preferable that the belt-like electrode 13 to be formed of metal.

The width of the belt-like electrodes 13 preferably ranges from approximately 3 mm to approximately 30 mm. In a case where the width of the belt-like electrodes 13 is equal to or more than approximately 3 mm, it becomes difficult for the belt-like electrodes 13 are easily damaged when voltage is applied between the belt-like electrodes 13. In a case where the width of the belt-like electrodes 13 is equal to or less than approximately 30 mm, it becomes difficult for the heating volume of the honeycomb unit 11 to decrease when voltage is applied between the belt-like electrodes 13. Thereby, it becomes easy for the honeycomb structural body 10 to sufficiently convert exhaust gas.

Although the method for forming the belt-like electrodes 13 is not limited in particular, the method may be, for example, spraying, sputtering or the like.

Figure 3:
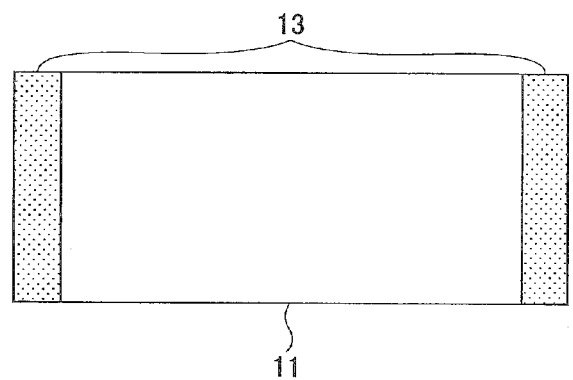
FIG. 3 is a schematic diagram illustrating a plane on which an adhesive layer of the honeycomb unit of FIG. 1.
Figure 4:
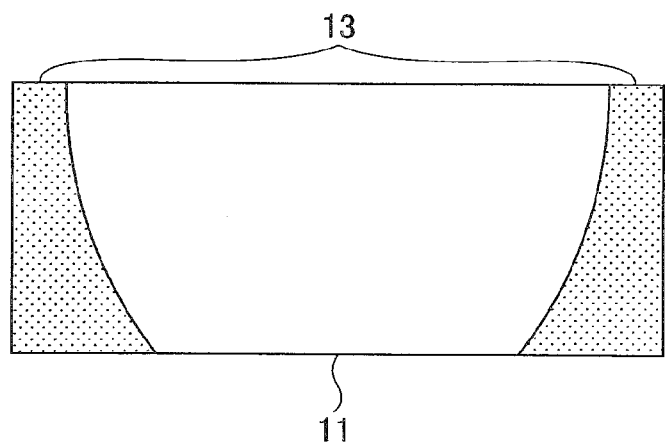
FIG. 4 is a schematic diagram illustrating a modified example of the honeycomb unit of FIG. 3.
Figure 5:
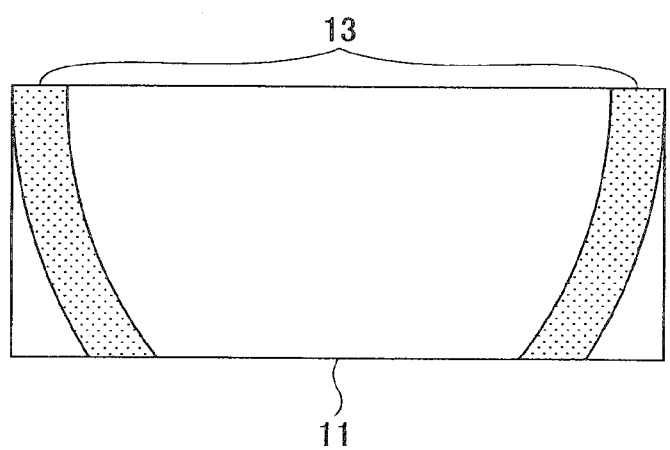
FIG. 5 is a schematic diagram illustrating a modified example of the honeycomb unit of FIG. 3.

The above-described belt-like electrodes 13 provided between the honeycomb unit 11 and the adhesive layer 12 are formed in a manner that the distance between belt-like electrodes 13 is substantially constant with respect to the radial direction of the honeycomb structural body 10 (see FIG. 3). However, the belt-like electrodes 13 may be formed in a manner that the distance between belt-like electrodes 13 becomes shorter the closer towards the center of the honeycomb structural body 10 (see FIGS. 4 and 5). Thereby, the center portion of the honeycomb structural body 10 becomes easier to generate heat. It is to be noted that FIG. 4 illustrates a case where the width of the belt-like electrodes 13 becomes larger towards the center of the honeycomb structural body 10, and FIG. 5 illustrates a case where the width of the belt-like electrodes 13 is substantially constant with respect to the radial direction of the honeycomb structural body 10.

Further, instead of using the above-described electrodes 13 having a belt-like shape, electrodes 13 having a wave-like shape or a zigzag shape may be used.

FIG. 6 illustrates a modified example of a honeycomb structural body 10' according to an embodiment of the present invention. The honeycomb structural body 10' has first and second belt-like electrodes 13' formed in a manner extending from a part of the outer peripheral surface of the honeycomb unit 11 which does not face the adhesive layer 12 to an area between the honeycomb unit 11 and the adhesive layer 12. The configuration of the honeycomb structural body 10' is substantially the same as that of the honeycomb structural body 10 except for the belt-like electrodes 13'.

The belt-like electrodes 13' are formed on the part of the outer peripheral surface of each honeycomb unit 11 which does not face the adhesive layer 12 and the area between the honeycomb unit 11 and the adhesive layer 12. Therefore, in a case where voltage is applied from an automobile battery to the four pairs of the belt-like electrodes 13' via annular conductive materials electrically connected to the four pairs of the belt-like electrodes 13', it becomes easy for the current density of the current flowing in the outer peripheral portion of the honeycomb unit 11 to be higher than the current density of the current flowing in the center portion of the honeycomb unit 11. As a result, it becomes easy for the heating value at the outer peripheral portion of the honeycomb unit 11 to be larger than the heating value at the center portion of the honeycomb unit 11. Thereby, it becomes easy for the temperature at the outer peripheral portion of the honeycomb unit 11 to be higher than the temperature at the center portion of the honeycomb unit 11. Even in a case of canning the honeycomb structural body 10' to the metal pipe 30 and using the honeycomb structural body 10' as an exhaust gas conversion apparatus in a state where a holding sealing member 20 is provided to the outer peripheral portion of the honeycomb structural body 10', it becomes easy for the temperature at the outer peripheral portion of the honeycomb structural body 10' to be prevented from decreasing even if the heat insulation property of the holding sealing member 20 is insufficient. Further, in a case where the honeycomb structural body 10' is used as an exhaust gas conversion apparatus, it becomes easy for the temperature at the outer peripheral portion of the honeycomb structural body 10' to be prevented from decreasing even if the heat insulation property of the holding sealing member 20 is insufficient because a substantially equal amount of voltage is applied to the four honeycomb units 11. Therefore, it becomes easy for the temperature of the honeycomb structural body 10' to become substantially uniform, and it becomes easy for preventing cracks from being generated.

The configuration of the belt-like electrodes 13' is substantially the same as the configuration of the belt-like electrodes 13 except for the shape of the belt-like electrodes 13'.

Figure 7:
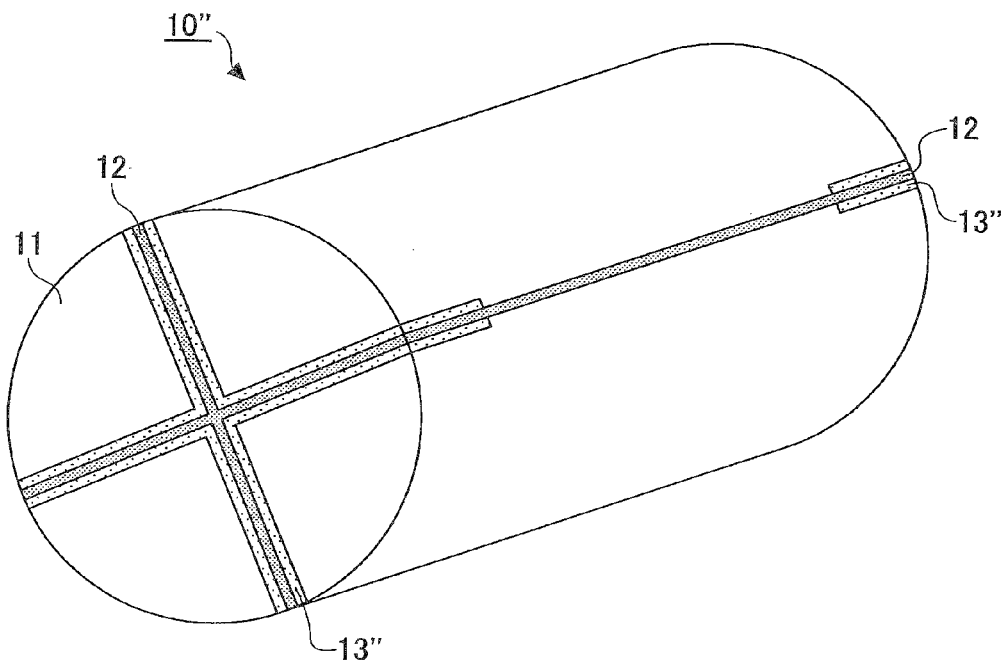
FIG. 7 is a perspective view illustrating a modified example of the honeycomb structural body of FIG. 1.

FIG. 7 illustrates a modified example of the honeycomb structural body 10 according to an embodiment of the present invention. Instead of the belt-like electrodes 13, the honeycomb structural body 10" has first and second belt-like electrodes 13" formed in an area between the outer peripheral surface of the honeycomb unit 11 and the adhesive layer 12 and an area including a center of the substantially fan-shaped cross section perpendicular to the longitudinal direction of the honeycomb unit 11. The configuration of the honeycomb structural body 10" is substantially the same as the configuration of the honeycomb structural body 10 except for the belt-like electrodes 13".

The belt-like electrodes 13" are formed in an area between the outer peripheral surface of the honeycomb unit 11 and the adhesive layer 12 and an area including the center of the substantially fan-like shaped cross section perpendicular to the longitudinal direction of the honeycomb unit 11. Therefore, in a case where voltage is applied from an automobile battery to the four pairs of the belt-like electrodes 13" via annular conductive materials electrically connected to the four pairs of the belt-like electrodes 13", it becomes easy for the current density of the current flowing in the center portion of the honeycomb unit 11 to be higher than the current density of the current flowing in the outer peripheral portion of the honeycomb unit 11. As a result, it becomes easy for the heating value at the center portion of the honeycomb unit 11 to be larger than the heating value at the outer peripheral portion of the honeycomb unit 11. Thereby, it becomes easy for the temperature at the center portion of the honeycomb unit 11 to be higher than the temperature at the outer peripheral portion of the honeycomb unit 11. Even in a case of canning the honeycomb structural body 10" to the metal pipe 30 and using the honeycomb structural body 10" as an exhaust gas conversion apparatus in a state where a holding sealing member 20 is provided to the outer peripheral portion of the honeycomb structural body 10", it becomes easy for the temperature at the outer peripheral portion of the honeycomb structural body 10" to easily decrease because it becomes easy for the flow rate of exhaust gas to become higher the closer towards the center portion of the honeycomb structural body 10" according to the principle of inertia. However, it becomes easy for the temperature at the center portion of the honeycomb structural body 10" to be prevented from decreasing. Further, in a case where the honeycomb structural body 10" is used as an exhaust gas conversion apparatus, the temperature at the center portion of the honeycomb structural body 10" can be prevented from decreasing because a substantially equal amount of voltage is applied to the four honeycomb units 11. Therefore, it becomes easy for the temperature of the honeycomb structural body 10" to become uniform, and it becomes easy for the exhaust gas conversion property of the honeycomb structural body 10" to be prevented from degrading.

It is to be noted that the configuration of the belt-like electrodes 13" is substantially the same as the configuration of the belt-like electrodes 13 except for the shape of the belt-like electrodes 13".

Further, the belt-like electrodes 13" may also be formed at a part of the outer peripheral surface of the honeycomb unit 11 which does not face the adhesive layer 12. Thereby, the belt-like electrodes 13" can be electrically connected to the annular conductive materials more easily.

FIG. 8 illustrates an example of an exhaust gas conversion apparatus 100 according to an embodiment of the present invention. The above-described exhaust gas conversion apparatus 100 is obtained by canning the above-mentioned honeycomb structural body 10 to the metal pipe 30 in a state where the holding sealing member 20 is provided to the outer peripheral portion of the honeycomb structural body 10. An automobile battery (not illustrated) is connected to the belt-like electrodes 13 of the honeycomb structural body 10. Accordingly, it becomes easy for heat to be generated in the honeycomb structural body 10 by applying voltage between the four pairs of the belt-like electrodes 13 from the automobile battery.

Accordingly, owing to the substantially circular-pillar shape or the substantially elliptical-pillar shape of the honeycomb structural body according to the above-described embodiments of the present invention, it becomes difficult for disconnection of electrodes to occur. Further, in the honeycomb structural body according to the above-described embodiments of the present invention, it becomes easy for the heating value at the center portion of the honeycomb structural body and the heating value at the outer peripheral portion of the honeycomb structural body to be adjusted owing to forming a substantially fan-like shaped or a substantially elliptical fan-like shaped cross section perpendicular to the longitudinal direction of the honeycomb unit and forming pairs of the belt-like electrodes in a part of an outer peripheral surface which does not face the adhesive layer of the honeycomb unit along with an area between the honeycomb unit and the adhesive layer, and/or an area between the outer peripheral surface of the honeycomb unit and the adhesive layer along with an area including the center of the substantially fan-like shaped cross section perpendicular to the longitudinal direction of the honeycomb unit.

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb structural body comprising:
the honeycomb structural body having a substantially circular-pillar shape or a substantially elliptical-pillar shape;
a plurality of honeycomb units adhered to each other by interposing an adhesive layer, each of the plurality of honeycomb units containing a conductive ceramic material and having a substantially fan shaped cross section or a substantially elliptical fan shaped cross section perpendicular to a longitudinal direction of each of the plurality of honeycomb units, each of the plurality of honeycomb units comprising:
cell walls extending along the longitudinal direction to define a plurality of through-holes; and
first and second electrodes provided at a part of an outer peripheral surface of each of the plurality of honeycomb units that does not face the adhesive layer and provided at a first area between each of the plurality of honeycomb units and the adhesive layer, and/or the first and second electrodes being provided at a second area between the outer peripheral surface of each of the plurality of honeycomb units and the adhesive layer and provided at a third area including a center of the substantially fan shaped cross section or the substantially elliptical fan shaped cross section.

2. The honeycomb structural body as claimed in claim 1, wherein the first and second electrodes are provided at an entire outer periphery of each of the plurality of honeycomb units.

3. The honeycomb structural body as claimed in claim 1, wherein each of the plurality of honeycomb units has a first end portion and a second end portion opposite to the first end portion in the longitudinal direction, and
wherein the first and second electrodes are provided on the first end portion and the second end portion of each of the plurality of honeycomb units, respectively.

4. The honeycomb structural body as claimed in claim 1, wherein a distance between the first and second electrodes becomes shorter towards the center of the substantially fan shaped cross section or the substantially elliptical fan shaped cross section.

5. The honeycomb structural body as claimed in claim 1, wherein the substantially fan shaped cross section or the substantially elliptical fan shaped cross section has a center angle of approximately 90 degrees or less.

6. The honeycomb structural body as claimed in claim 1, wherein each of the first and second electrodes comprises a belt electrode having a width ranging from approximately 3 mm or more to approximately 30 mm or less.

7. The honeycomb structural body as claimed in claim 6, wherein a distance between the first and second electrodes is adjusted so that a resistance between the first and second electrodes is substantially equal.

8. The honeycomb structural body as claimed in claim 6, wherein a resistance between the first and second electrodes ranges from approximately 1Ω to approximately 1× 10³Ω.

9. The honeycomb structural body as claimed in claim 6, wherein the belt electrode comprises metal.

10. The honeycomb structural body as claimed in claim 6, wherein the belt electrode is provided at the part of the outer peripheral surface of each of the plurality of honeycomb units that does not face the adhesive layer.

11. The honeycomb structural body as claimed in claim 1, wherein the first and second electrodes are provided by spraying or sputtering.

12. The honeycomb structural body as claimed in claim 1, wherein the plurality of through-holes are partitioned by the cell walls, and
wherein a catalyst is carried on the cell walls.

13. The honeycomb structural body as claimed in claim 12, wherein the catalyst includes at least one of platinum, rhodium, and palladium.

14. The honeycomb structural body as claimed in claim 1, wherein the conductive ceramic material contains silicon carbide.

15. The honeycomb structural body as claimed in claim 14, wherein the silicon carbide is doped with aluminum nitride or aluminum.

16. The honeycomb structural body as claimed in claim 1, wherein each of the plurality of honeycomb units has a porosity ranging from approximately 25% to approximately 50%.

17. The honeycomb structural body as claimed in claim 1, wherein the substantially fan shaped cross section or the substantially elliptical fan shaped cross section perpendicular to the longitudinal direction has an area ranging from approximately 5 cm² to approximately 50 cm².

18. The honeycomb structural body as claimed in claim 1, wherein the substantially fan shaped cross section or the substantially elliptical fan shaped cross section perpendicular to the longitudinal direction has an opening ratio ranging from approximately 50% to approximately 85%.

19. The honeycomb structural body as claimed in claim 1, wherein a density of the plurality of through-holes of the substantially fan shaped cross section or the substantially elliptical fan shaped cross section perpendicular to the longitudinal direction ranges from approximately 15.5 units per cm² to approximately 186 units per cm².

20. The honeycomb structural body as claimed in claim 1, wherein the cell walls of each of the plurality of honeycomb units have a thickness ranging from approximately 0.05 mm to approximately 0.30 mm.

21. The honeycomb structural body as claimed in claim 1, wherein a base material of each of the plurality of honeycomb units comprises silicon carbide, aluminum titanate, cordierite, alumina, silica, zirconia, or zeolite.

22. The honeycomb structural body as claimed in claim 1, wherein a base material of each of the plurality of honeycomb units has pores, and
wherein a conductive material is provided inside the pores of the base material.

23. The honeycomb structural body as claimed in claim 22, wherein the conductive material comprises silicon or silicide.

24. The honeycomb structural body as claimed in claim 23, wherein the silicide comprises nickel silicide, chrome silicide, or iron silicide.

25. The honeycomb structural body as claimed in claim 1, wherein the first and second electrodes comprise wave electrodes or zigzag electrodes.

26. An exhaust gas conversion apparatus comprising:
the honeycomb structural body as claimed in claim 1.

27. The exhaust gas conversion apparatus as claimed in claim 26,
wherein the first and second electrodes are provided at an entire outer periphery of each of the plurality of honeycomb units.

28. The exhaust gas conversion apparatus as claimed in claim 26,
wherein each of the plurality of honeycomb units has a first end portion and a second end portion opposite to the first end portion in the longitudinal direction, and
wherein the first and second electrodes are provided on the first end portion and the second end portion of each of the plurality of honeycomb units, respectively.

29. The exhaust gas conversion apparatus as claimed in claim 26,
wherein a distance between the first and second electrodes becomes shorter towards the center of the substantially fan shaped cross section or the substantially elliptical fan-like shaped cross section.

30. The exhaust gas conversion apparatus as claimed in claim 26,
wherein the substantially fan shaped cross section or the substantially elliptical fan shaped cross section has a center angle of approximately 90 degrees or less.

31. The exhaust gas conversion apparatus as claimed in claim 26,
wherein each of the first and second electrodes comprises a belt electrode having a width ranging from approximately 3 mm or more to approximately 30 mm or less.

32. The exhaust gas conversion apparatus as claimed in claim 31,
wherein a distance between the first and second electrodes is adjusted so that a resistance between the first and second electrodes is substantially equal.

33. The exhaust gas conversion apparatus as claimed in claim 31,
wherein a resistance between the first and second electrodes ranges from approximately $1\Omega$ to approximately $1\times 10^3 \Omega$.

34. The exhaust gas conversion apparatus as claimed in claim 31,
wherein the belt electrode comprises metal.

35. The exhaust gas conversion apparatus as claimed in claim 31,
wherein the belt electrode is provided at the part of the outer peripheral surface of each of the plurality of honeycomb units that does not face the adhesive layer.

36. The exhaust gas conversion apparatus as claimed in claim 26,
wherein the first and second electrodes are provided by spraying or sputtering.

37. The exhaust gas conversion apparatus as claimed in claim 26,
wherein the plurality of through-holes are partitioned by the cell walls, and
wherein a catalyst is carried on the cell walls.

38. The exhaust gas conversion apparatus as claimed in claim 37,
wherein the catalyst includes at least one of platinum, rhodium, and palladium.

39. The exhaust gas conversion apparatus as claimed in claim 26,
wherein the conductive ceramic material contains silicon carbide.

40. The exhaust gas conversion apparatus as claimed in claim 39,
wherein the silicon carbide is doped with aluminum nitride or aluminum.

41. The exhaust gas conversion apparatus as claimed in claim 26,
wherein each of the plurality of honeycomb units has a porosity ranging from approximately 25% to approximately 50%.

42. The exhaust gas conversion apparatus as claimed in claim 26,
wherein the substantially fan shaped cross section or the substantially elliptical fan shaped cross section perpendicular to the longitudinal direction has an area ranging from approximately 5 $cm^2$ to approximately 50 $cm^2$.

43. The exhaust gas conversion apparatus as claimed in claim 26,
wherein the substantially fan shaped cross section or the substantially elliptical fan shaped cross section perpendicular to the longitudinal direction has an opening ratio ranging from approximately 50% to approximately 85%.

44. The exhaust gas conversion apparatus as claimed in claim 26,
wherein a density of the plurality of through-holes of the substantially fan shaped cross section or the substantially elliptical fan shaped cross section perpendicular to the longitudinal direction ranges from approximately 15.5 units per $cm^2$ to approximately 186 units per $cm^2$.

45. The exhaust gas conversion apparatus as claimed in claim 26,
wherein the cell walls of each of the plurality of honeycomb units have a thickness ranging from approximately 0.05 mm to approximately 0.30 mm.

46. The exhaust gas conversion apparatus as claimed in claim 26,
wherein a base material of each of the plurality of honeycomb units comprises silicon carbide, aluminum titanate, cordierite, alumina, silica, zirconia, or zeolite.

47. The exhaust gas conversion apparatus as claimed in claim 26,
wherein a base material of each of the plurality of honeycomb units has pores, and
wherein a conductive material is provided inside the pores of the base material.

48. The exhaust gas conversion apparatus as claimed in claim 47,
wherein the conductive material comprises silicon or silicide.

49. The exhaust gas conversion apparatus as claimed in claim 48,
wherein the silicide comprises nickel silicide, chrome silicide, or iron silicide.

50. The exhaust gas conversion apparatus as claimed in claim 26,
wherein the first and second electrodes comprise wave electrodes or zigzag electrodes.

* * * * *